United States Patent
Okamura

(10) Patent No.: US 8,591,331 B1
(45) Date of Patent: Nov. 26, 2013

(54) DISPLAY CONTROL SYSTEM, DISPLAY CONTROL METHOD, DISPLAY CONTROL DEVICE, AND COMPUTER-READABLE STORAGE MEDIUM

(71) Applicant: Nintendo Co., Ltd., Kyoto (JP)

(72) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/713,850

(22) Filed: Dec. 13, 2012

(30) Foreign Application Priority Data

May 28, 2012 (JP) .................... 2012-121001

(51) Int. Cl.
*G06F 9/24* (2006.01)
(52) U.S. Cl.
USPC .......................................... 463/31
(58) Field of Classification Search
USPC .......................................... 463/31
See application file for complete search history.

(56) References Cited

U.S. PATENT DOCUMENTS

| | | | | |
|---|---|---|---|---|
| 7,585,225 | B2* | 9/2009 | Minagawa | 463/33 |
| 2004/0157662 | A1* | 8/2004 | Tsuchiya | 463/32 |
| 2005/0202869 | A1 | 9/2005 | Miyamoto et al. | |
| 2007/0191096 | A1* | 8/2007 | Tanaka | 463/31 |
| 2009/0305758 | A1* | 12/2009 | Nomura | 463/7 |
| 2010/0164960 | A1* | 7/2010 | Asami | 345/473 |
| 2013/0130791 | A1* | 5/2013 | Myogan | 463/30 |

FOREIGN PATENT DOCUMENTS

JP 2005-192986 7/2005

* cited by examiner

*Primary Examiner* — Pierre E Elisca
(74) *Attorney, Agent, or Firm* — Nixon & Vanderhye P.C.

(57) ABSTRACT

An exemplary game device displays on a display a character within a virtual space. A predetermined user operation is received by a touch panel. Further, the CPU moves the character within the virtual space, while the predetermined user operation is received by the touch panel. The CPU causes the character to make a predetermined motion and bring back the position of the character to the position before the character is moved, when a period from the start to the end of the predetermined user operation is shorter than a predetermined period.

14 Claims, 9 Drawing Sheets

DISPLAY CONTROL SYSTEM, DISPLAY CONTROL METHOD, DISPLAY CONTROL DEVICE, AND COMPUTER-READABLE STORAGE MEDIUM

CROSS REFERENCE TO RELATED APPLICATION

The present application claims priority from Japanese Patent Application No. 2012-121001, which was filed on May 28, 2012, the disclosure of which is herein incorporated by reference in its entirety.

FIELD

The technology herein relates to a display control system, a display control method, a display control device, and a display control program each enabling reception of two or more instructions including an instruction to move a character, in the form of predetermined operations, and in particular, the technology herein relates to the display control system, the display control method, the display control device, and a computer-readable storage medium each enabling correction of a position of the character after the character moves.

BACKGROUND AND SUMMARY

Traditionally, there has been widely known a display control device (e.g. game device) in which a character is moved within a virtual space in response to predetermined user operations (e.g. operations by touching: hereinafter, touch operations) received via a controller (e.g. touch panel).

In traditional display control devices, the predetermined user operations are assigned exclusively to instructions to move the character. Users in general however want to be able to input various instructions. To meet the needs of the users, one conceivable approach is to improve the traditional technology so that a predetermined user operation for moving a character is also assigned to a different instruction.

It is an object of the technology herein to provide a display control system, a display control method, a display control device, and a display control program each enabling prevention of problems attributed to assignment of a predetermined operation to two or more instructions including the movement of the character.

(1) An exemplary embodiment is a display control system configured to display a character in a virtual space. This display control system includes: a controller, a mover, and a motion controller. The controller is configured to receive a predetermined user operation. The mover is configured to move the character within the virtual space, while the predetermined user operation is received by the controller. The motion controller is configured to cause the character to make a predetermined motion and bring back the position of the character to the position before the character is moved by the mover in response to the predetermined user operation, when a period from the start to the end of the predetermined user operation is shorter than a predetermined period.

In the above structure, the character moves within the virtual space during the period of receiving the predetermined user operation; however, if the period from the start to the end of the reception of the predetermined user operation is shorter than the predetermined period at the end of the reception of the predetermined user operation, the character makes a predetermined motion. As described, it is possible to input two ore more types of instructions by a predetermined user operation; i.e., an instruction to move the character, and an instruction to cause the character to make a predetermined motion.

As hereinabove mentioned, when a predetermined user operation is assigned to an operation for inputting two or more types of instructions including an instruction to move the character, the user may unintentionally move the character, even though the user conducted the predetermined user operation to cause the character to make a predetermined motion. Occurrence of an unintended effect additionally to the effect intended by the user through the predetermined user operation spoils the enjoyment. If user does not wish to move the character, an operation is needed to bring back the character to the position before the movement, which is troublesome. This is particularly true when the predetermined motion is a motion the user wishes the character to make frequently, the operation of bringing back the position needs to be executed frequently, which is significantly troublesome for the user.

In the above-structure, when the period from the start to the end of reception of the predetermined user operation is shorter than the predetermined period, the predetermined user operation is regarded as an operation intended to cause the character to make a predetermined motion, and the position of the character is corrected to bring back to the position of character before the movement by the predetermined user operation. As described, when the character moves although the movement is not intended by the user, the position of the character is automatically changed to return. This effectively prevents the enjoyment from being spoiled by occurrence of an unintended effect in addition to the effect intended by the user. Further, there is no need for the user-troubling operation for bringing back the character to the position before the movement.

(2) the controller may be a pointing device. Further, while an operation of the pointing device designating a position within the display is received as the predetermined user operation, the mover may move the character within the virtual space based on the position designated. The motion controller may cause the character to make a motion based on the position designated, as the predetermined motion.

Since a use of the pointing device allows designation of a position within the display, it is possible to cause an effect to occur based on the designated position. If there are two or more types of effects which occur based on the basis of position designated, the enjoyment of the displayed content is improved. The above structure improves enjoyment of the displayed control by assigning a predetermined user operation to two or more types of instructions, i.e., an instruction to move the character based on the designated position; and an instruction to cause the character to make a predetermined motion based on the designated position. Further, since the position of the character is corrected as described above, it is possible to solve the problem caused by assigning the predetermined user operation to two or more types of instructions, while improving the enjoyment of the displayed content by assigning the predetermined user operation to two or more types of instructions.

(3) The motion controller may cause the character to make a motion of moving an object other than the character to the position designated, as the motion based on the position designated. With this structure, a predetermined user operation enables input of two or more types of instructions: i.e., an instruction to move the character based on the designated position; and an instruction to cause the character to make the motion of moving another object to the designated position. Thus, the predetermined user operation enables input of instructions to change the positions of two types of objects (character, and the other object). Further, as is mentioned above, since the position of the character is corrected, it is possible to solve the problem caused by assigning the predetermined user operation to instructions for changing the positions of two types of objects.

(4) The pointing device may be a touch panel. In general, when the pointing device is a touch panel, a touch panel is disposed so as to overlap the display, and such a display may only allow one pointing device for designating a position.

However, since the above structure assigns the predetermined user operation to two or more types of instructions, it is possible to provide two or more types of different effects based on the designated position, even when the structure only allows one pointing device for designating a position. Further, as hereinabove mentioned, since the position of the character is corrected, it is possible to provide the above effects, while solving the problem caused by assigning the predetermined user operation to instructions for changing the positions of two types of objects.

(5) The display control system may further include a position storage configured to store, as a correction-end position, the position before the character is moved by the mover in response to the predetermined user operation. Further, the motion controller may change the position of the character gradually from a correction-start position to the correction-end position stored in the position storage, the correction-start position being the position of the character at an end of reception of the predetermined user operation. Since this structure gradually brings back the position of the character to the position before the movement, the position of the character is corrected without giving visually uncomfortable feeling to the user.

(6) The display control system may further include: a display and a camera position changer. The display is configured to display an image of the virtual space taken by a virtual camera set within the virtual space The camera position changer is configured to change the position of the camera to follow a movement of the character at a predetermined follow rate, so that the camera and the character have a predetermined positional relation. Further, the camera position changer sets the predetermined follow rate so that the follow rate in a first period is lower than that of a second period, the first period being part of a period of receiving the predetermined user operation by the controller, ranging from a start of receiving the predetermined user operation to a predetermined time, the second period being part of the period of receiving the predetermined user operation by the controller, excluding the first period.

In the above structure, when the character is moved by the predetermined user operation, the position of the camera is also changed, following the movement of the character, so that the camera and the character have a predetermined positional relation. However, when the period from the start to the end of the reception of the predetermined user operation is shorter than the predetermined period, the position of the character is corrected to the position before the character is moved by the predetermined user operation. When the period from the start to the end of the reception of the predetermined user operation is shorter than the predetermined period, the camera and the character have the predetermined positional relation after the correction of the position of the character, without need of the camera position following the movement of the character. Therefore, the camera position following the movement of the character is an unnecessary process, until a period from the start of reception of the predetermined user operation reaches a predetermined period. Further, if the camera follows the movement of the character, and follows the change in the position of the character by the correction, the viewpoint reciprocates within a short period which may cause the user to feel visually uncomfortable.

In the above structure however, since the follow rate is set so that the follow rate in a period from the start of the reception of the predetermined user operation to the point where elapsed time reaches a predetermined time is lower than that of the other period, the unnecessary process of having the camera position following the character hardly occurs, and the user feels visually less uncomfortable.

Further, the above mentioned examples may be implemented in the forms of display control method, display control device, and a computer-readable storage medium.

With the above structure, it is possible to assign a predetermined operation to two or more instructions including the movement of the character, while preventing the problem in doing so.

DETAILED DESCRIPTION OF NON-LIMITING EXAMPLE EMBODIMENTS

The following describes an embodiment in which a display control device of the technology herein is applied to a game device.

(Structure of Game Device)

Figure 1:
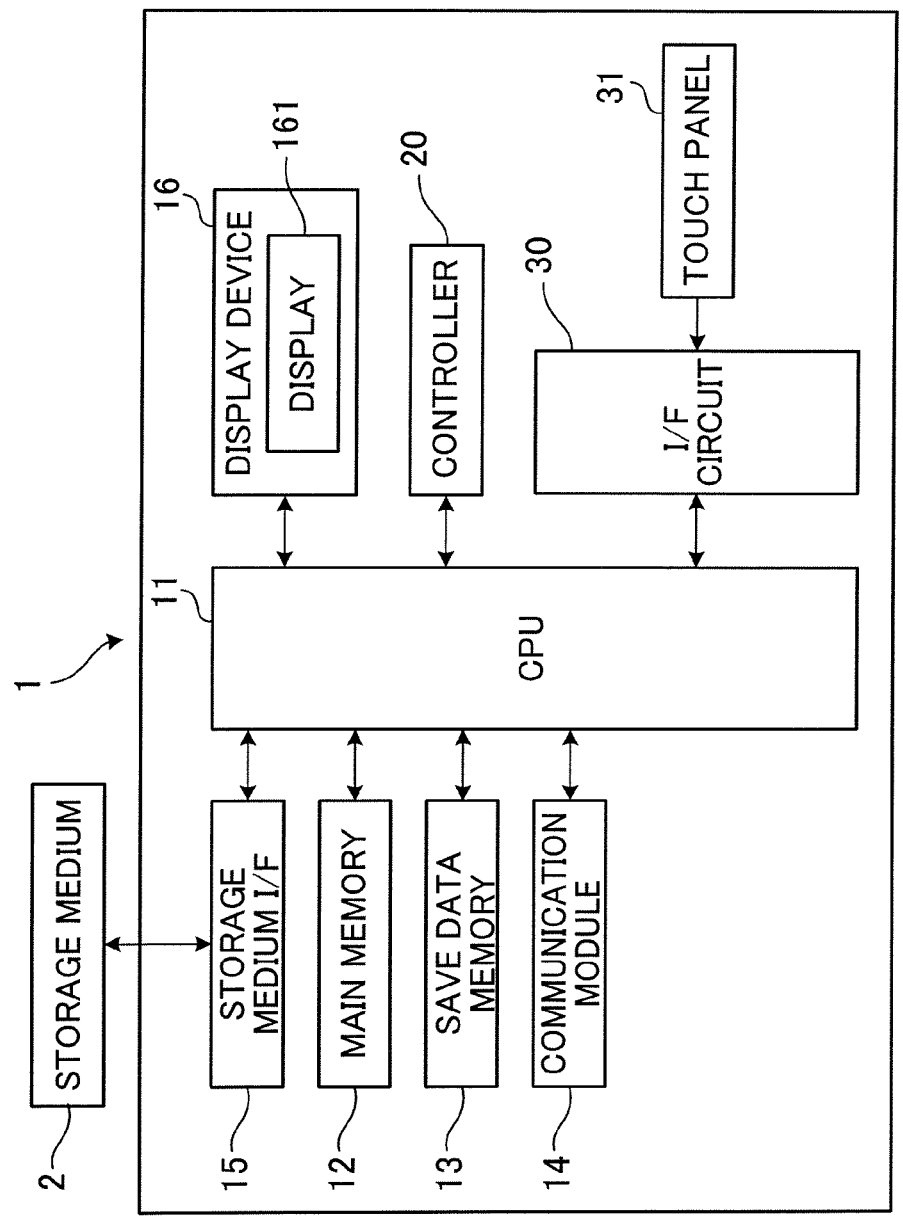
FIG. 1 shows a block diagram showing a non-limiting example of the internal structure of a game device related to one embodiment.

FIG. 1 shows a block diagram showing a non-limiting example of the internal structure of a game device related to one embodiment. A game device 1 (an example of display control device, display control system) includes: a CPU 11, a main memory 12, a save data memory 13, a communication module 14, a storage medium interface (storage medium I/F) 15, a display device 16, a controller 20, an interface circuit (I/F circuit) 30, and the like.

The CPU 11 (an example of mover, motion controller, camera position changer) is connected, via not-shown buses, to the main memory 12, the save data memory 13, the communication module 14, the storage medium I/F 15, the display device 16, the controller 20, and the I/F circuit 30.

The CPU 11 runs a predetermined program to execute predetermined information processing. This predetermined information processing includes a later-described main process. The main process includes display control based on a predetermined display control method.

The main memory 12 (example of position storage) serves as a work area for the CPU 11. In other words, the main memory 12 stores: a predetermined program obtained from the outside via a communication module 14, a storage medium I/F15, or the like; and various types of data to be used in the later-described main process and the communication process. The save data memory 13 is a rewritable and non-volatile memory.

The communication module 14 has a function of conducting wireless communication with another information processing device, in compliance with a communication standard of IEEE 802.11b/g, or the like.

To the storage medium I/F15 is detachably connected the storage medium 2 (example of a memory card, or the like). To and from this storage medium 2, the storage medium I/F 15 writes and reads data in response to instructions from the CPU 11.

For example, the display device 16 is a liquid crystal display device having a display 161 such as a liquid crystal display.

The controller 20 has at least one operation component which receives an operation by a user. Operation information indicating the operation received via the operation component is transmitted to the CPU 11.

The I/F circuit 30 is connected to the touch panel 31. This I/F circuit 30 includes a touch panel control circuit for controlling the touch panel 31. The touch panel control circuit generates at every predetermined cycle operation data indicating the coordinates of a position on the touch panel 31 touched by a user, based on signals from the touch panel 31, and outputs this operation data to the CPU 11.

The touch panel 31 (example of the controller) is superimposed on the display 161, and inputs signals based on the position touched by the user to the touch panel control circuit.

(Game Image)

Figure 2:
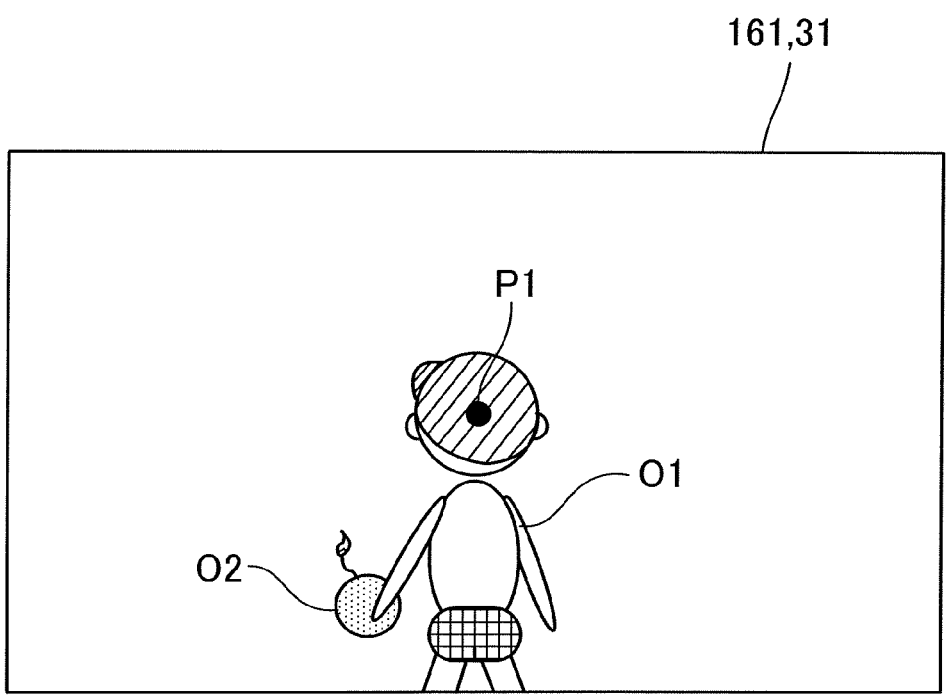
FIG. 2 shows a screen diagram showing a non-limiting example of a game image displayed on the display.

With reference to FIG. 2, the following describes a game image displayed on the display 161 by the game device 1. FIG. 2 shows a screen diagram showing a non-limiting example of a game image displayed on the display. As shown in FIG. 2, the game device 1 generates a game image which is an image of a character O1 in a three-dimensional virtual space and which is taken by a virtual camera, and displays the game image on the display 161. The character O1 moves within the virtual space in response to a touch operation (example of a "predetermined user operation"), i.e., touching the touch panel 31 with a user's finger or the like. For example, the character O1 has an item object O2 such as a bomb, and in response to a touch operation to the touch panel 31 by the user, the character O1 makes a motion (example of "predetermined motion") to throw the item object O2 to a predetermined position in the virtual space. The game related to the present embodiment is, for example, an action game or the like which attacks an enemy character (not shown) with the item object O2 thrown by the character O1. It should be however noted that the type of game is not limited to action games.

As described above, in the present embodiment, a touch operation by the user to the touch panel 31 enables input of two different instructions; i.e., an instruction to move the character O1; and an instruction to cause the character O1 to make a motion of throwing the item object O2.

Figure 3:
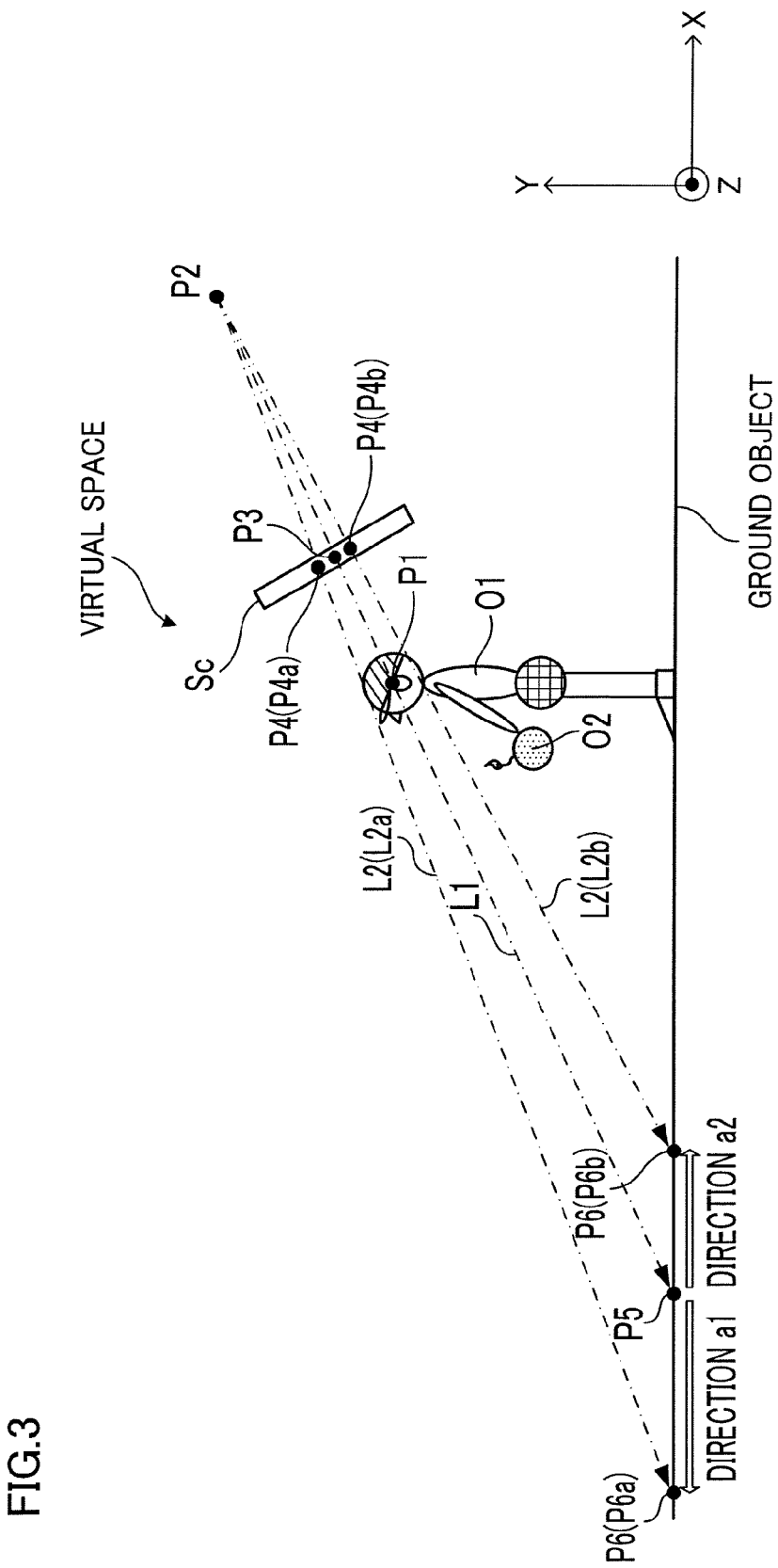
FIG. 3 shows a non-limiting example of a virtual space.

The character O1 has its reference point P1 displayed basically at the center of the display 161. Further, the character O1 is displayed so that a graphical perspective is rendered from behind and slightly above the character O1. The positional relation (example of "predetermined positional relation") of the camera to the character O1 to realize this is described with reference to FIG. 3. Note however that the positional relation of the camera to the character O1 described with reference to FIG. 3 is no more than an example, and may be set to any positional relation as long as the character O1 is displayed on the display 161. Further, for example, the positional relation means the distance and direction of the camera from the reference point P1.

FIG. 3 is a non-limiting example of the virtual space. As shown in FIG. 3, a camera position P2 is basically set so that the camera's line of vision passes the reference point P1 of the character O1. This way, the reference point P1 of the character O1 is projected at the center P3 of an imaginary screen Sc for projecting thereto the virtual space. Therefore, the virtual space is displayed with the reference point P1 of the character O1 positioned at the center of the display 161.

Further, the camera position P2 is set behind the character O1, away from the same by a predetermined distance. The camera angle is set so that the camera's view of line and the horizontal plane forms a predetermined angle, rendering a view of looking down the character O1 from obliquely above. This way, a game image is displayed which shows the back of the character O1 viewed from obliquely above.

(Movement of Character O1)

Next, the following describes the movement of the character O1 with reference to FIG. 3. The character O1 moves in response to a touch operation to the touch panel 31, in a direction based on the touch operation. Note that the character O1 keeps moving at a predetermined speed while the touch operation is continued, and stops when the touch operation ends (touch-end).

Note that the moving direction of the character O1 is derived as follows. Supposing that P3 is a position on the screen Sc where the reference point P1 is projected, a straight line passing through the position P3 and the camera position P2 is referred to as straight line L1. Further, supposing that a position P4 (P4a, P4b) is a position of the screen Sc corresponding to the position touched, a straight line passing through this position P4 and the camera position P2 is referred to as straight line L2 (L2a, L2b). Note that the screen Sc is set to be perpendicular to the camera's line of vision. With the above supposition, the moving direction of the character O1 is defined as to be a direction from a position P5 to a position P6 (P6a, P6b), the position P5 being a position where the straight line L1 crosses the horizontal plane set in the virtual space, and the position P6 being the position where the straight line L2 crosses the horizontal plane. In FIG. 3, the horizontal plane is a ground surface of a ground object. For example, when a position corresponding to the position P4a of the touch panel 31 is touched, the moving direction of the character O1 is a direction a1. On the other hand, when a position corresponding to the position P4b of the touch panel 31 is touched, the moving direction of the character O1 is a direction a2.

(Motion of Character O1 to Throw Item Object O2)

Next, with reference to FIG. 3, the following describes a motion of throwing the item object O2 which is made by the character O1. As hereinabove mentioned, a touch operation to the touch panel 31 enables not only an instruction to move the character O1, but also an instruction to cause the character O1 to make a motion of throwing the item object O2. Specifically, when the duration of the touch operation to the touch panel 31 is shorter than a predetermined period at the end of the touch operation, the character O1 makes the motion of throwing the item object O2. When the duration of the touch operation is equal to or longer than the predetermined period, the character O1 does not make the motion of throwing the item object O2. Note that the duration of the touch operation is a period from the start to the end of the touch operation, and is hereinafter referred to as "duration of touching". Further, the start of touch operation and the end of the touch operation are also referred to as "touch-start" and "touch-end", respectively.

The position to which the item object O2 is thrown is determined based on the position of the touch operation at the touch-end timing. For example, when the touch operation takes place in a position corresponding to the position P4a on the screen Sc at the touch-end timing, the item object O2 may be thrown to the position P6a. Note however that the position to which the item object O2 is thrown may be determined based on the position of the touch operation at the touch-start timing, instead of the touch-end timing.

(Correction of Position of Character O1)

Next, with the reference to FIG. 3, the following describes correction of the position of the character O1, which is a characteristic of the present embodiment. In the present embodiment, the position of the character O1 is corrected at the touch-end timing, if the duration of touching is equal to or longer than the predetermined period. Specifically, the position of the character O1 is corrected to the position at the beginning of the touch operation (touch-start timing) (i.e., to the position of the character O1 before the movement in response to the touch operation). As is mentioned hereinabove, the game device 1 causes the character O1 to make the motion of throwing the item object O2, when the duration of touching is shorter than the predetermined period. As such, the cases where the duration of touching is shorter than the predetermined period means the cases where the user conducted a touch operation to input an instruction that causes the character O1 to make the motion of throwing the item object O2.

The character O1 moves during the touching operation, even when the duration of touching falls short of the predetermined period. In other words, the character O1 moves even when the movement is not intended by the user and this may spoil the enjoyment of the game. In the present embodiment however, the position of the character O1 is corrected to the position at the start of the touch operation, when the duration of touching is shorter than the predetermined period, as hereinabove mentioned. Therefore, the enjoyment of the game is kept from being spoiled even when the character O1 is unintentionally moved. The automatic correction of the position of the character O1 sets the user free of troublesome operations to bring back the character O1 to its position at the start of the touch operation.

As hereinabove mentioned, in the present embodiment, the game device 1 executes a game in which the item object O2 is thrown to attack an enemy character (not shown). As such, the user frequently conducts the touch operation for causing the character O1 to make the motion of throwing the item object O2. Without correction of the position of the character O1, the user is significantly stressed by troublesome operations for correcting the position of the character O1, and the enjoyment of the game is significantly spoiled. In view of this, correcting the position of the character O1 as described above is significantly effective in a structure that receives, in the form of touch operation, an instruction to be frequently input by the user as in the case of the present embodiment.

(Process of Camera Position Following Character)

As hereinabove described with reference to FIG. 3, the camera position in the present embodiment is set so that the camera and the character has a predetermined positional relation. When the character O1 moves, the camera position also moves and follows the movement. In the present embodiment, the game device 1 causes the camera position to follow the position of the character O1 at a follow rate based on a setting of a camera interpolation speed. The camera interpolation speed is a parameter indicating the follow rate of the camera position with respect to the position of the character O1, and is expressed in numerical values ranging from "0.0" to "1.0". Moving the camera at the predetermined follow rate restrains the rapid movement of the camera and achieves camera work that looks natural. The camera position that achieves the positional relation shown in FIG. 3 is hereinafter referred to as camera targeted position. This camera targeted position is determined based on the position of the character O1.

The follow rate is 0% when the camera interpolation speed is set to "0.0", and the camera does not at all follow the position of the character O1. On the other hand, the follow rate is 100% when the camera interpolation speed is set to "1.0", and the camera position is always at the camera targeted position. In other words, the camera position moves at the same moving speed, and by the same amount, as the character O1. Further, when the camera interpolation speed is set to "0.6", the follow rate is 60%. In this case, the camera position moves, within a single frame, 60% of the displacement in the camera targeted position.

Figure 4:
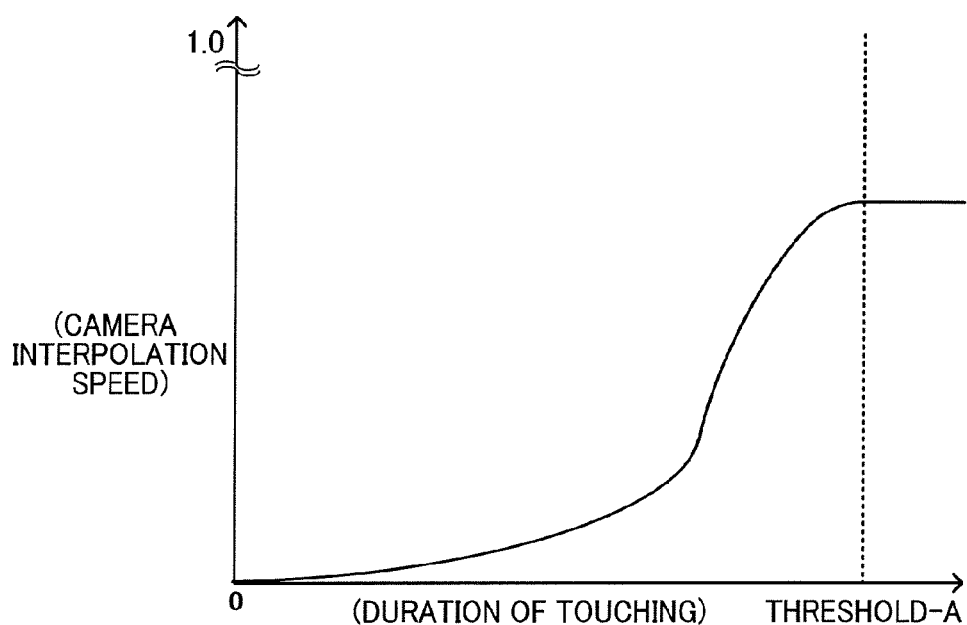
FIG. 4 shows a graph indicating a non-limiting example of variation in a camera interpolation speed based on duration of touching.

In the present embodiment, the camera interpolation speed varies based on the duration of touching. With reference to FIG. 4, FIG. 5A, FIG. 5B, and FIG. 5C, the following describes variation in the camera interpolation speed. FIG. 4 shows a graph indicating a non-limiting example of variation in a camera interpolation speed based on the duration of touching.

The camera interpolation speed is set so that, within the period of the touch operation, the camera interpolation speed is lower before the duration of touching reaches the predetermined period, as compared with the camera interpolation speed when and after the duration of touching reaches the predetermined period. As such, the follow rate is lower before the duration of touching reaches the predetermined time, as compared with that when and after the duration of touching reaches the predetermined time. For example, as shown in FIG. 4, when the duration of touching reaches a threshold-A corresponding to the predetermined period, the camera interpolation speed is set to a normal setting. Once the duration of touching reaches the threshold-A, the camera interpolation speed is kept at the normal setting and is not changed. However, until the duration of touching reaches the threshold-A, the camera interpolation speed is set lower than the normal setting, and the follow rate is lower as such.

As hereinabove mentioned, when the duration of touching is shorter than the predetermined period at the touch end timing, the position of the character O1 is corrected to its position at the touch-start timing. Thus, after the position of the character O1 is corrected, the camera and the character O1 have the predetermined positional relation without a need of the camera position following the movement of the character O1; i.e., the camera following the character O1 is an unnecessary process. In the present embodiment, until the duration of touching reaches the predetermined period, the position of the character O1 may be corrected, and for this reason, the follow rate of the camera position relative to the movement of the character O1 is set low. This effectively prevents unnecessary movement of the camera. If the camera follows the movement of the character O1 and follows correction in the position of the character O1, the camera position reciprocates within a short period which may cause the user to feel visually uncomfortable; however, the follow rate set as described above reduces such a risk.

Before the duration of touching reaches the threshold-A, the camera interpolation speed is set so as to increase with an increase in the duration of touching. The reason for such a setting is as follows. When and after the duration of touching reaches the predetermined period, the position of the character O1 is not corrected at the touch-end timing, and the camera interpolation speed is preferably set to the normal setting. However, if the camera interpolation speed is set to "0.0" until the duration of touching reaches the threshold-A and changed to the normal setting when the duration of touching reaches the threshold-A, the camera abruptly starts following the character O1, which consequently gives slightly uncomfortable vision to the user. This however is prevented in the present embodiment, because the camera interpolation speed gradually increases up to the normal setting. Needless to say that the camera interpolation speed may be set constant until the duration of touching reaches the threshold-A, and may be changed to the normal setting when the duration of touching reaches the threshold-A.

Figure 5A:
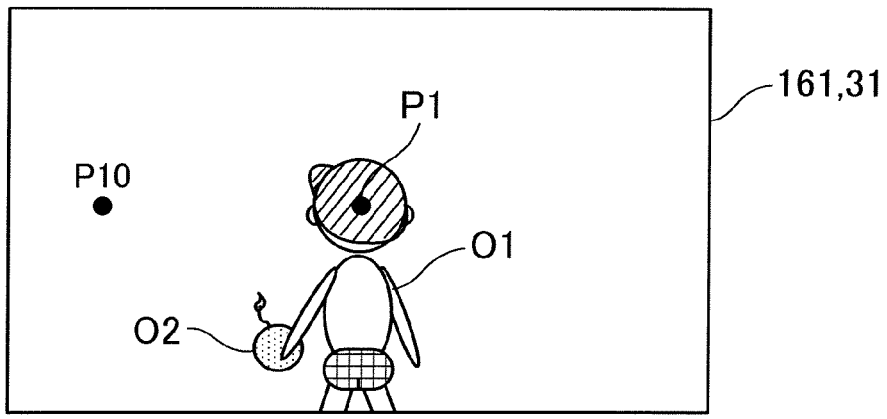
FIG. 5A shows a non-limiting example of a screen diagram (part 1) explaining control of a character position and a camera position in response to a touch operation.
Figure 5B:
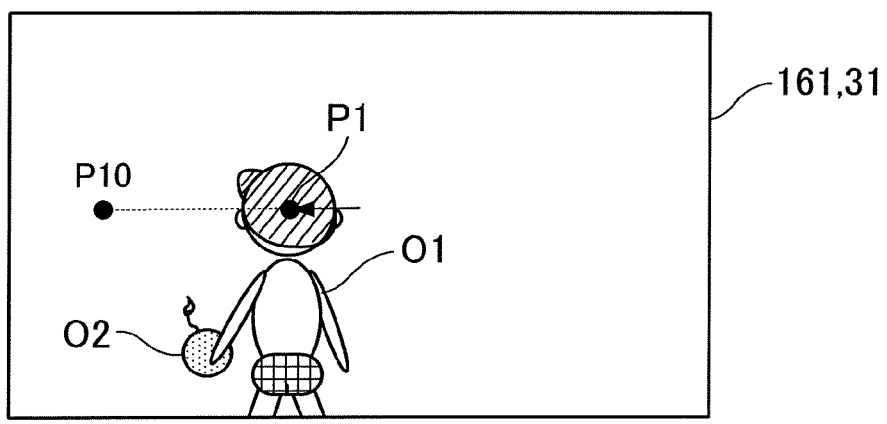
FIG. 5B shows a non-limiting example of a screen diagram (part 2) explaining control of a character position and a camera position in response to the touch operation.
Figure 5C:
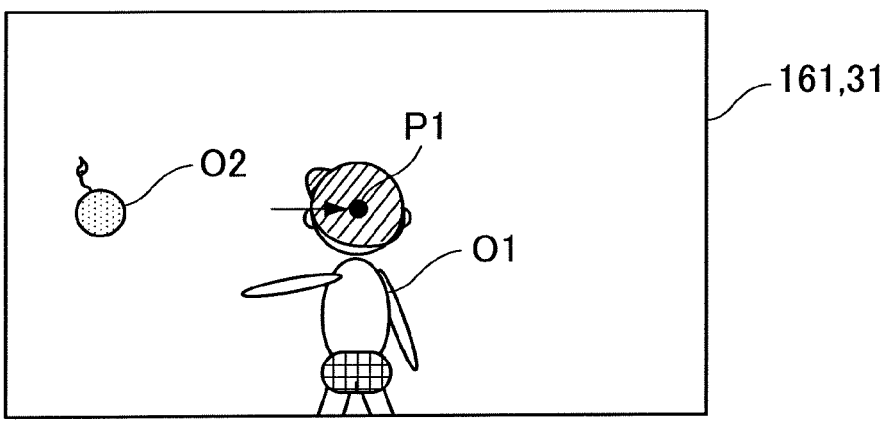
FIG. 5C shows a non-limiting example of a screen diagram (part 3) explaining control of a character position and a camera position in response to the touch operation.

With reference to FIG. 5A to FIG. 5C, the following describes how the game image is displayed when the duration of touching is such that the camera interpolation speed at the touch-end timing is "0.0". FIG. 5A to FIG. 5C each show non-limiting examples of screen diagrams (part 1-3) explaining control of a character position and a camera position in response to a touch operation.

As shown in FIG. 5A, suppose the user started to touch a position P10 which is just beside the reference point P1 of the character O1 (on the left side of the reference point P1). In this case, for example, the character O1 is supposed to move along the Z-axis of FIG. 3, towards the viewer of the figure. Since the camera interpolation speed is "0.0" immediately after the touch-start timing, the camera does not at all follow the character O1. Therefore, as shown in FIG. 5B, the character O1 displayed on the display 161 moves from the position where the reference point P1 is displayed towards the position P10. The moving direction and the moved distance of the character O1 are indicated by the arrow in FIG. 5B. As shown in FIG. 5C, when the touching ends, the character O1 moves back to the position at the touch-start timing, while making the motion of throwing the item object O2. The moving direction and the moved distance of the character O1 are indicated by the arrow in FIG. 5C. Since the touching ends at a timing such that the resulting duration of touching corresponds to the camera interpolation speed of "0.0", the camera position does not follow the movement of the character O1, and the position of the character O1 on the display 161 is changed. Further, when the correction of the position of the character O1 is ended, the item object O2 is moved so as to reach a predetermined position based on the position touched at the touch-end timing.

In the above is described a case of the duration of touching such that the camera interpolation speed at the touch-end timing is "0.0", with reference to FIG. 5A to FIG. 5C. When the duration of touching is long enough to result in a camera interpolation speed other than "0.0", the camera position moves in the same direction as the moving direction of the character O1, at the follow rate based on the duration of touching. Although, in this case, the position of the character O1 is corrected when the touching ends, the camera follows the character O1, along with the correction of the position of the character O1, at the follow rate corresponding to the duration of touching up to the touch-end timing. As described, the follow rate of the camera rises with an increase in the movement of the character O1, and therefore the camera position is brought back faster to the position of the touch-start timing.

(Memory Map)

Figure 6:
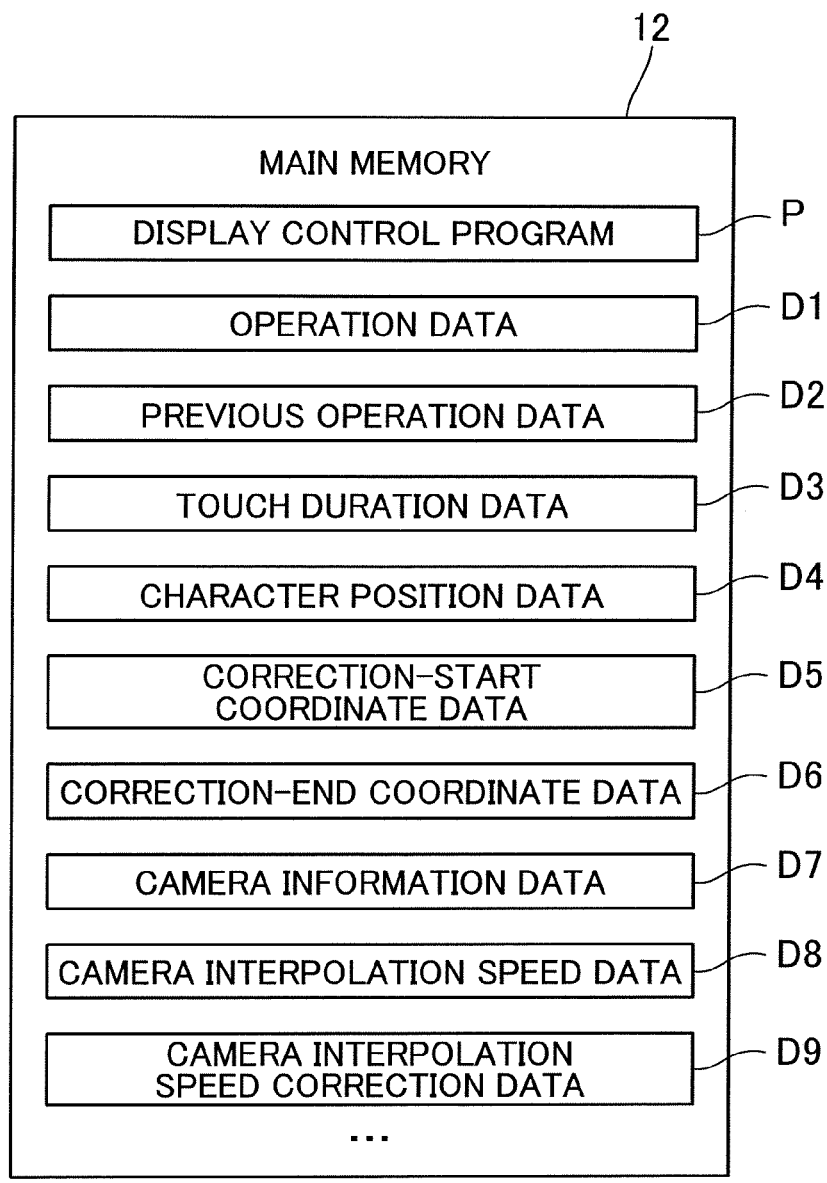
FIG. 6 shows a non-limiting example of a memory map of the main memory.

With reference to FIG. 6, the following describes main programs and data stored in the main memory 12. FIG. 6 shows a non-limiting example of a memory map of the main memory. The main memory 12 stores a display control program P, and by running the display control program P, stores operation data D1, previous operation data D2, touch duration data D3, character position data D4, correction-start coordinate data D5, correction-end coordinate data D6, camera information data D7, camera interpolation speed data D8, and camera interpolation speed correction data D9.

The display control program P is a program for causing the CPU 11 to execute the main process. Note that the display control program P may be input from the storage medium 2 (FIG. 1) or from another information processing device via the communication module 14 (FIG. 1). The operation data D1 is obtained in processing of a current frame, and indicates whether or not there is a touch input to the touch panel 31 and indicates the touched position of the touch input. The previous operation data D2 is obtained in processing of a previous frame (previous frame processing), and indicates whether or not there is a touch input to the touch panel 31 and indicates the touched position of the touch input. The touch duration data D3 indicates the duration of touching. The character position data D4 indicates the position of the character O1 in the virtual space, in the form of X, Y, Z coordinates.

The correction-start coordinate data D5 indicates a correction-start position of the character O1 in the virtual space. The correction-end coordinate data D6 indicates a correction-end position of the character O1 in the virtual space. The camera information data D7 indicates the camera position and direction in the virtual space. The camera interpolation speed data D8 indicates the camera interpolation speed. The camera interpolation speed correction data D9 indicates variation in the camera interpolation speed, based on the duration of touching, as shown in FIG. 4 for example. The camera interpolation speed correction data D9 is used for correcting the camera interpolation speed data D8.

Figure 7:
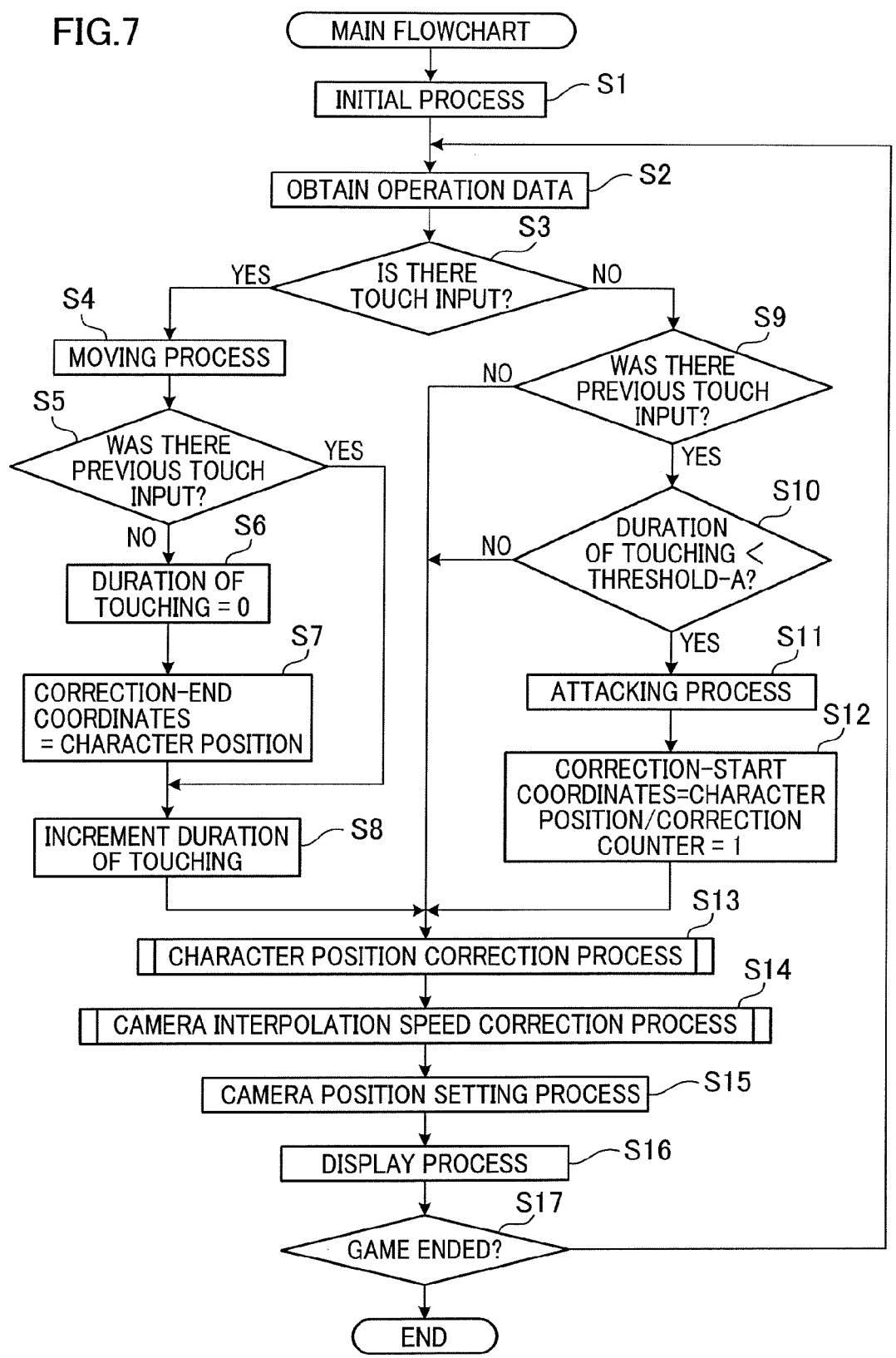
FIG. 7 shows a flowchart showing a non-limiting example of a main process.

With reference to FIG. 6 and FIG. 7, the following describes the main process executed by the CPU 11. FIG. 7 shows a flowchart showing a non-limiting example of a main process. The CPU 11 first executes an initial process for building a three-dimensional virtual space or the like (S1). Next, the CPU 11 obtains the operation data D1 from the touch panel 31 (S2). Note that, while the CPU 11 stores the operation data D1 obtained in the main memory 12, the CPU 11 stores previously obtained operation data D1 as the previous operation data D2 in the main memory 12. The CPU 11 then determines if there is a touch input, based on the operation data D1 (S3). The "touch input" means an input of signals to the CPU 11, which is attributed to the touch operation of the user to the touch panel 31. When it is determined that there is a touch input (S3: YES), the CPU 11 executes a process of moving the character O1 in the virtual space by a predetermined distance (moving process) (S4). Specifically in the moving process, the character position data D4 is updated.

The CPU 11 then determines if there was a touch input in the previous frame processing (S5). This is done by referring to the previous operation data D2. When it is determined that there was no touch input in the previous frame processing (S5: NO), the CPU 11 sets the duration of touching to "0"

(S6). This is done by updating the touch duration data D3. Note that step S5 resulting in "NO" means that touching is started. The CPU 11 then sets the correction-end coordinates to the current position of the character O1 (stores in the main memory 12) (S7). Specifically, the correction-end coordinate data D6 is updated. After this, the CPU 11 increments the duration of touching by "1" (S8). This is done by updating the touch duration data D3.

When, on the other hand, it is determined that there was a touch input in the previous frame processing (S5: YES), the CPU 11 proceeds to step S8, without executing steps S6 and S7, and increments the duration of touching by "1". Note that step S5 resulting "YES" means the touch operation is continued. After this the CPU 11 executes a later-described process of step S13.

The following describes a process taking place when it is determined that there is no touch input (touch operation) (S3: NO). In such a case, the CPU 11 determines if there was a touch input in the previous frame processing (S9). This is done by referring to the previous operation data D2. When it is determined that there was a touch input in the previous frame processing (S9: YES), the CPU 11 refers to the touch duration data D3 to determine whether the duration of touching is shorter than the threshold-A (S10). Note that the timing of step S9 resulting "YES" is the touch-end timing. When the duration of touching is determined as to be shorter than the threshold-A (S10: YES), the CPU 11 executes an attacking process (S11).

The attacking process sets the motion (posture) of the character O1 so that the character O1 makes the motion of throwing the item object O2, taking several frames. Further, the process sets the position of the item object so that the item object O2 reaches a predetermined position, taking several frames. The predetermined position is determined based on the position designated by the touch operation through a method described hereinabove with reference to FIG. 3, or the like. Next, the CPU 11 sets the correction counter to "1" (stores in the main memory 12), and sets the correction-start coordinates to the current position of the character O1 (S12). This setting of the correction-start coordinates is done by updating the correction-start coordinate data D5. After this, the CPU 11 executes later-described step S13.

When it is determined that there is no touch input in the previous frame processing (S9: NO), the process proceeds to the later-described step S13, without executing step S10 to step S12, under control of the CPU 11. Note that step S9 resulting "NO" means a status without the touch input is continued. When it is determined that the duration of touching is equal to or longer than the threshold-A (S10: NO), the process proceeds to the later-described step S13 without executing step S11 and S12, under control of the CPU 11.

In step S13, the CPU 11 executes a character position correction process (S13). The character position correction process is a process of correcting the position of the character O1, when the duration of touching up to the touch-end timing is shorter than the threshold-A; i.e., when the duration of touching is shorter than the predetermined period. Specifically, the position of the character O1 is corrected from its position at the touch-end timing (correction-start coordinates) to its position at the touch-start timing (correction-end coordinates), taking several frames.

Specifically, in the character position correction process, the position of the character O1 is corrected when the value of the correction counter stored in the main memory 12 is "1" or greater. Note that step S10 resulting in "YES", i.e., when the duration of touching up to the touch-end timing is determined as to be shorter than the threshold-A, the correction counter is set to "1" in step S12. Therefore, the position of the character O1 is corrected. The character position correction process is detailed later with reference to FIG. 8.

Next, the CPU 11 executes a camera interpolation speed correction process (S14). In the camera interpolation speed correction process, the camera interpolation speed data D8 is updated so as to set the camera interpolation speed based on the duration of touching. The camera interpolation speed correction process is detailed later with reference to FIG. 9.

The CPU 11 calculates a new camera position based on the camera interpolation speed data D8 and the camera information data D7, and updates the camera information data D7 so that the new position is indicated by the data D7 (S15). After this, the CPU 11 executes a process of generating a game image of the virtual space taken by the virtual camera and displays the image on the display 161 (display process) (S16).

Next, the CPU 11 determines whether the game ending condition is satisfied (S17). When it is determined that the game ending condition is satisfied (S17: YES), the CPU 11 ends the main process. When it is determined that the game ending condition is not satisfied (S17: NO), the process returns to step S2 under control of the CPU 11. Note that the processes from step S2 is repetitively executed at every drawing cycle (every 1/60 sec) until step S17 results in "YES".

(Character Position Correction Process)

Figure 8:
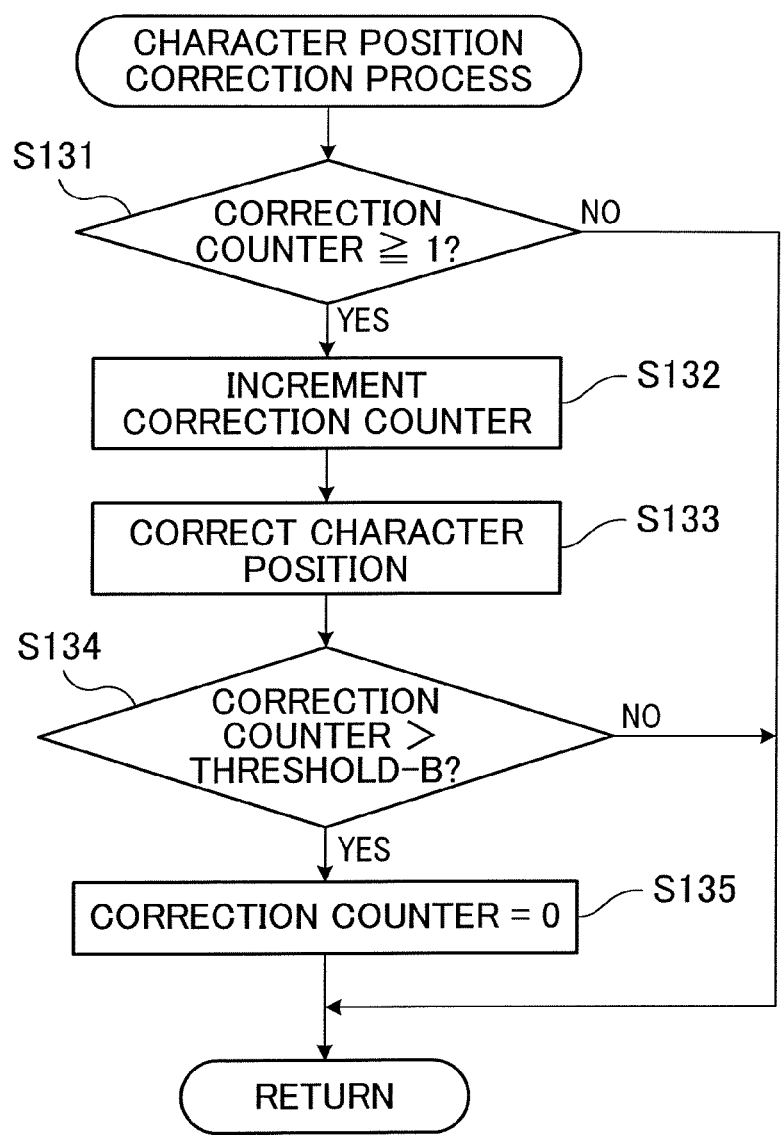
FIG. 8 shows a flowchart showing a non-limiting example of a character position correction process.

Next, with reference to FIG. 8, the following describes the character position correction process executed in step S13 of the main process. The CPU 11 first refers to the main memory 12 to determine whether the value of the correction counter is "1" or greater (S131). When it is determined that the value of the correction counter is "1" or greater (S131: YES), the CPU 11 increments the value of the correction counter by "1" (S132). Then, the CPU 11 executes the process of correcting the position of the character O1 (S133). In this process, the position of the character O1 is corrected so as to move from the correction-start coordinates to the correction-end coordinates taking, for example, 30 frames from the touch-end timing. Needless to mention that the number of frames taken in the correction is not limited to 30 frames, provided that the number of frames corresponds to a later-described threshold-B.

Figure 9:
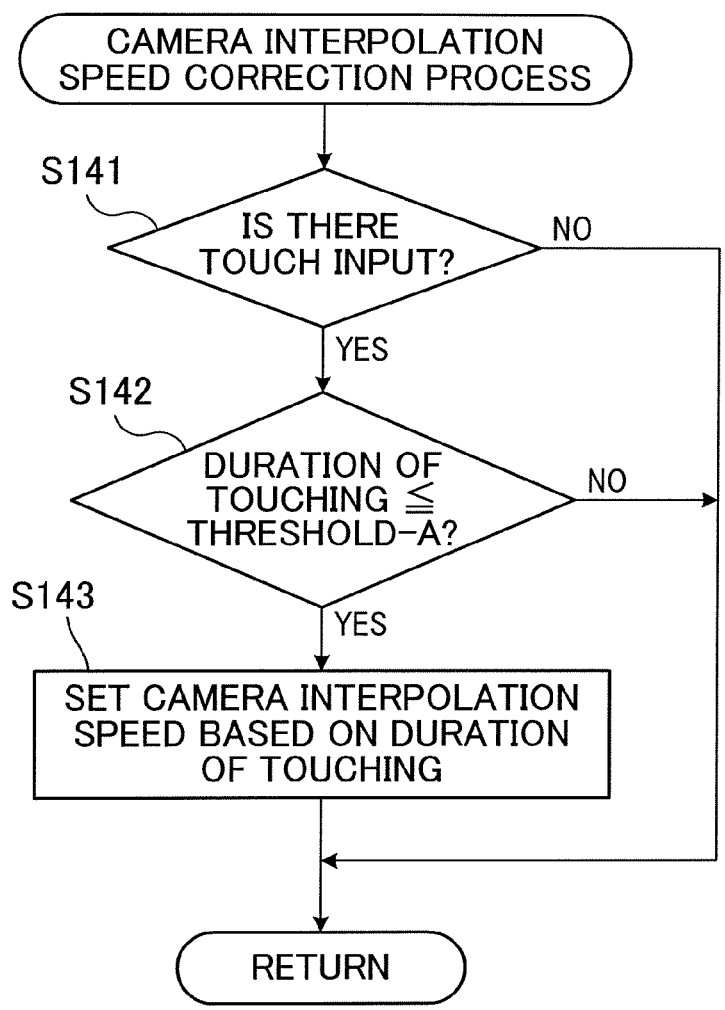
FIG. 9 shows a flowchart showing a non-limiting example of a camera interpolation speed correction process.

Next, the CPU 11 determines whether the value of the correction counter exceeds the threshold-B (S134). When it is determined that the value of the correction counter exceeds the threshold-B (S134: YES), the CPU 11 updates the value of the correction counter in the main memory 12 to "0" (S135). This completes the correction of the position of the character O1 taking the several frames. For example, the threshold-B is 30 frames (approximately 0.5 sec). The threshold-A used in step S10 of FIG. 7 and in later-described step S141 of FIG. 9 is set to a value substantially the same as the threshold-B. Then, the character position correction process is ended and the process returns to the main process under control of the CPU 11.

On the other hand, when it is determined that the value of the correction counter is not "1" or greater (S131: NO), the CPU 11 ends the character position correction process without executing step S132 to step S135, and returns to the main process. This is because the present moment is not a period for correcting the position of the character O1, when the value of the correction counter is not "1" or greater. When it is determined that the value of the correction counter does not exceed the threshold-B (S134: NO), the CPU 11 ends the character position correction process without executing step S135, and returns to the main process.

(Camera Interpolation Speed Correction Process)

Next, with reference to FIG. 9, the following describes the camera interpolation speed correction process executed in step S14 of the main process. The CPU 11 first determines if there is a touch input, as is done in step S3 (S141). When it is determined that there is no touch input (S141: NO), the CPU 11 ends the camera interpolation speed correction process and returns to the main process shown in FIG. 7. On the other hand, when it is determined that there is a touch input (S141: YES), the CPU 11 refers to the touch duration data D3 to determine whether the duration of touching is equal to or shorter than the threshold-A (S142).

When the duration of touching is equal to or shorter than the threshold-A (S142: YES), the CPU 11 refers to the camera interpolation speed correction data D9, obtains the camera interpolation speed corresponding to the duration of touching, and updates the camera interpolation speed data D8 to indicate the camera interpolation speed (S143). After that, the CPU 11 ends the camera interpolation speed correction process and the process returns to the main process shown in FIG. 7.

When the duration of touching is greater than the threshold-A (S142: NO), the CPU 11 ends the camera interpolation speed correction process and returns to the main process shown in FIG. 7.

(Modifications)

(1) The present embodiment deals with a case where the touch operation causes the character O1 to make the motion of throwing the item object O2; however, the technology disclosed herein is not limited to this, and the character O1 may make any given motion as the predetermined motion. For example, the touch operation may cause the character O1 to make the motion to move an object other than the item object O2 relative to a designated position.

(2) The present embodiment deals a case where the touch operation to the touch panel 31 enables instruction to move the character O1, and an instruction to make a predetermined motion; however, the "predetermined user operation" is not limited to the touch operation. For example, the predetermined user operation may be an operation to designate a position on the display 161 by using a pointing device other than the touch panel 31. The pointing device other than the touch panel 31 may be, for example, a mouse, or a device including a light emitter provided to one of the periphery of the display and the controller, and a light receiver such as an imaging element or the like provided to the other one of the periphery of the display and the controller. Further, the "predetermined user operation" may be received by using a controller other than the pointing device.

(3) The present embodiment deals with a case where the character O1 is brought back to the position at the touch-start timing, through the correction of the position of the character O1; however, the technology disclosed herein is not limited to such a structure. The position of the character O1 does not have to be completely brought back to the position at the touch-start timing, as long as the position of the character O1 is corrected so as to return to the position of the touch-start timing.

(4) The present embodiment deals with a case where the character O1 is a game character; however, the technology herein is not limited to this, and the character O1 may be displayed in the form of image other than the game image.

(5) The present embodiment deals with a case where the camera follows the character O1; however, the technology herein is not limited to this, and the camera position may be fixed or may be settable to any position intended by the user.

(6) The game system and the game device of the embodiment may be modified as needed from those of the present embodiment. Further, the game device 1 may be a portable game device or stationary game device. Further, the game device 1 is not limited to a game-dedicated device and may be a PDA (Personal Digital Assistant), a mobile phone (encompassing smart phone), or the like, as long as the game device 1 is capable of running a game application to execute a game.

Further, the main process of the game device 1 may partially take place in another information processing device. For example, the technology herein may include one or more servers taking at least a part of the main process and a client terminal which is connected and in communication with the one or more servers. Alternatively, the technology herein may be a distributed system including a plurality of game devices 1 connected to each other directly or via a network, each of which devices takes a part in the main process. Further, the technology herein may include a game device and an operation device having a display. The display control system encompasses a structure including the other information processing device and the display control device such as the game device 1, and a structure including only the display control device.

What is claimed is:

1. A display control system configured to display a character in a virtual space, comprising:
   a controller configured to receive a predetermined user operation;
   a mover configured to move the character within the virtual space, while the predetermined user operation is received by the controller; and
   a motion controller configured to cause the character to make a predetermined motion and bring back the position of the character to the position before the character is moved by the mover in response to the predetermined user operation, when a period from the start to the end of the predetermined user operation is shorter than a predetermined period.

2. The system according to claim 1, wherein:
   the controller is a pointing device;
   while an operation of the pointing device designating a position within the display is received as the predetermined user operation, the mover moves the character within the virtual space based on the position designated; and
   the motion controller causes the character to make a motion based on the position designated, as the predetermined motion.

3. The system according to claim 2, wherein the motion controller causes the character to make a motion of moving an object other than the character to the position designated, as the motion based on the position designated.

4. The system according to claim 2, wherein the pointing device is a touch panel.

5. The system according to claim 1, further comprising a position storage configured to store, as a correction-end position, the position before the character is moved by the mover in response to the predetermined user operation, wherein the motion controller changes the position of the character gradually from a correction-start position to the correction-end position stored in the position storage, the correction-start position being the position of the character at an end of reception of the predetermined user operation.

6. The system according to claim 1, further comprising:
   a display configured to display an image of the virtual space taken by a virtual camera set within the virtual space; and a camera position changer configured to change the position of the camera to follow a movement of the character at a predetermined follow rate, so that the camera and the character have a predetermined positional relation, wherein the camera position changer sets the predetermined follow rate so that the follow rate in a first period is lower than that of a second period, the first period being part of a period of receiving the predetermined user operation by the controller, ranging from a start of receiving the predetermined user operation to a predetermined time, the second period being part of the period of receiving the predetermined user operation by the controller, excluding the first period.

7. A display control method configured to display a character in a virtual space, comprising:

(a) receiving a predetermined user operation;

(b) moving the character within the virtual space, while the predetermined user operation is received by the controller; and (c) causing the character to make a predetermined motion and bring back the position of the character to the position before the character is moved in step (b) in response to the predetermined user operation, when a period from the start to the end of the predetermined user operation is shorter than a predetermined period.

8. The method according to claim 7, wherein:

in step (a), an operation of a pointing device designating a position within the display is received as the predetermined user operation;

in step (b), the character is moved within the virtual space based on the position designated by the predetermined user operation, while the predetermined user operation is received; and in step (c), the character is controlled to make, as the predetermined motion, a motion based on the position designated by the predetermined user operation.

9. The method according to claim 8, wherein, in step (c), the character is controlled to make a motion of moving an object other than the character to the position designated, as the motion based on the position designated.

10. The method according to claim 8, wherein, in step (a), a touch panel is adopted as the pointing device to receive an operation of designating a position within the display.

11. The method according to claim 8, further comprising (d) storing, as a correction-end position, the position before the character is moved in step (b) in response to the predetermined user operation, wherein in step (c), the position of the character is changed gradually from a correction-start position to the correction-end position stored in step (d), the correction-start position being the position of the character at an end of reception of the predetermined user operation.

12. The method according to claim 7, further comprising:

(e) displaying an image of the virtual space taken by a virtual camera set within the virtual space; and (f) changing the position of the camera to follow a movement of the character at a predetermined follow rate, so that the camera and the character have a predetermined positional relation, wherein, in step (f), the predetermined follow rate is set so that the follow rate in a first period is lower than that of a second period, the first period being part of a period of receiving the predetermined user operation by the controller, ranging from a start of receiving the predetermined user operation to a predetermined time, the second period being part of the period of receiving the predetermined user operation by the controller, excluding the first period.

13. A display control device configured to display a character in a virtual space, comprising:

a controller configured to receive a predetermined user operation;

a mover configured to move the character within the virtual space, while the predetermined user operation is received by the controller; and a motion controller configured to cause the character to make a predetermined motion and bring back the position of the character to the position before the character is moved by the mover in response to the predetermined user operation, when a period from the start to the end of the predetermined user operation is shorter than a predetermined period.

14. A computer-readable non-transitory storage medium storing therein a display control program configured to display a character in a virtual space by using a display control device having a controller, the program being configured to cause a computer of the display control device to serve as:

a mover configured to move the character within the virtual space, while a predetermined user operation is received by the controller; and a motion controller configured to cause the character to make a predetermined motion and bring back the position of the character to the position before the character is moved by the mover in response to the predetermined user operation, when a period from the start to the end of the predetermined user operation is shorter than a predetermined period.

* * * * *